Feb. 17, 1959 — H. M. CORTNER — 2,873,521
CANNED FOOD EXTRACTOR
Filed Jan. 3, 1958 — 2 Sheets-Sheet 2
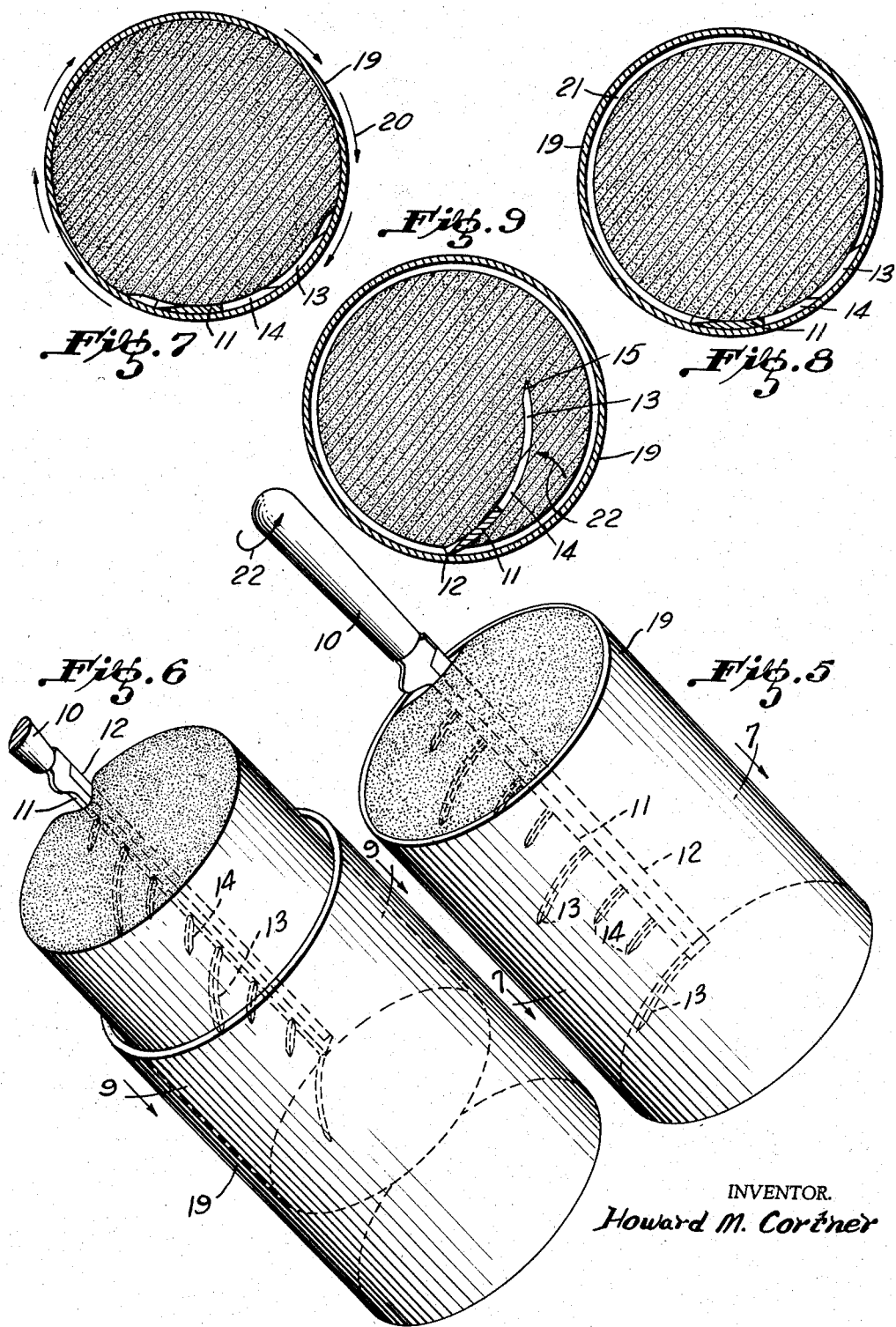
INVENTOR.
Howard M. Cortner

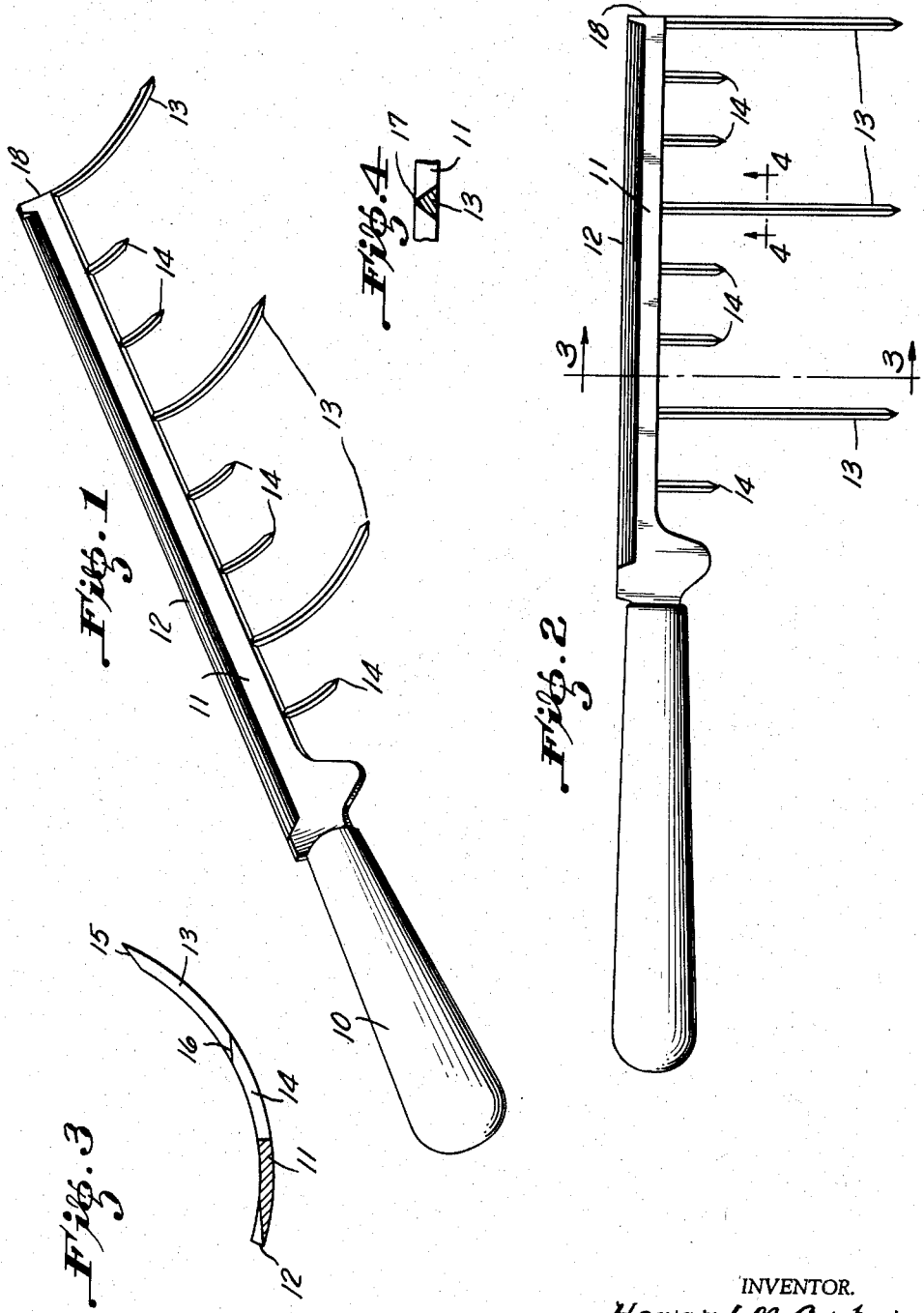

United States Patent Office 2,873,521
Patented Feb. 17, 1959

2,873,521

CANNED FOOD EXTRACTOR

Howard M. Cortner, Hanna City, Ill.

Application January 3, 1958, Serial No. 707,064

2 Claims. (Cl. 30—124)

The present invention relates to canned food extractor and has for an object to provide a device for extracting solid and moderately solid foods from their containers by a single withdrawal of the device from the can or container.

The present procedure used to remove moderately solid foods, as prepared dog food, from cans involves the combined use of first a knife to loosen the food from the sides of the can, then a fork to pry food out in chunks or fractional parts. This practice is both time consuming and quite awkward in its operation.

In the case of removal of solids, as brown bread, ham, Spam, etc. from cans it is important that the food, bread or meat, be removed in one piece to permit slicing in preparation for serving. It is accordingly another object of the invention to provide a simple device having no moving parts to be employed after one end of the container has been removed to extract in one piece without mutilation solid or moderately solid foods from a container.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is an isometric view of a canned food extractor constructed in accordance with the present invention.

Figure 2 is a plan view of the same.

Figure 3 is a transverse section taken on the line 3—3 in Figure 2.

Figure 4 is also a transverse sectional view taken on the line 4—4 in Figure 2.

Figure 5 is an isometric view showing the extractor of this invention entered in a container filled with solid or semi-solid contents.

Figure 6 is a similar view showing a subsequent position of the improved extractor with the teeth thereof embedded in the contents and with the contents partially withdrawn from the container.

Figure 7 is a cross sectional view taken on the line 7—7 in Figure 5 and illustrating an initial position of the extractor after insertion in the container.

Figure 8 is a similar view showing the extractor in a second position after having made a circular pass to loosen the contents from the internal wall of the container.

Figure 9 is a cross sectional view taken on the line 9—9 in Figure 6 showing the third and final position of the extractor with the same turned angularly to embed the teeth in the body of the contents of the container.

Referring more particularly to the drawings, 10 designates the handle of the extractor and 11 a blade which is substantially long and narrow and is given a slight curvature in a transverse direction in order to conform generally to the circular, elliptical or other form of the internal wall of a can or container.

At one side the blade 11 is formed with a knife or cutting edge 12 and at the other side thereof extend teeth 13 and 14 which are also curved transversely, as indicated in Figure 3, in the same pattern with the blade 11 so that the implement as a whole may conform generally to the curvature of the container. While the teeth 13, 14 may be all of the same length, it is preferred that some of the teeth 13 be long in comparison with certain other teeth 14 which are relatively short.

As shown more particularly in Figure 3 15 and 16 designate beveled or sharpened tip ends of the teeth 13, 14. As shown more particularly in Figure 4 the teeth may have reinforcing ribs 17 or be made cross sectionally in a triangular form.

The free end of the blade opposite the handle is provided with a sharp end 18 which facilitates the introduction of the implement into the can.

The container or can is represented conventionally at 19. In Figure 7 the clockwise arrows 20 indicate the initial direction of movement of the implement after having been inserted in the can.

In Figure 8 the angular space 21 is that produced by the circular movement in the direction of the arrows 20 of Figure 7 of the extractor.

The arrows in Figures 5 and 9 at 22 show a counter-clockwise rotation of the implement after completing the circular pass.

In operation, the implement is inserted lengthwise of itself and axially of the container with the end 18 of the implement leading. This insertion of the implement is as close to the container wall as possible. This initial position of the implement is shown in Figures 5 and 7.

Thereupon the implement is rotated in the direction of the arrows 20 of Figure 7 so as to make a complete pass around the internal wall of the container and between the wall and the contents. Figure 8 shows the completion of this circular pass which produces the space 21 between the can wall and the contents. By this movement the food has been loosened from the sides of the can.

Having completed this movement, the implement is then rotated counter-clockwise in the direction of the arrows 22 of Figures 5 and 9. In so doing the implement rocks on the knife edge 12 as a fulcrum. The implement is moved through a suitable angle so that the teeth 13 and 14 become embedded in the solid or semi-solid material within the container in the manner indicated in Figures 6 and 9. The triangular form of the teeth and the sharpened ends 15 and 16 thereof facilitate this penetrating movement. This movement may be continued until the blade becomes perpendicular to the side of the can.

With the extractor in this position the teeth provide maximum support for removing the food when the extractor is withdrawn in an axial direction from the container 19. The act of so doing is illustrated in Figure 6. By pulling out on the handle 10 the food is removed completely and in one piece.

Although I have disclosed herein the best form of the invention known to me at this time, I reserve the right to all such modifications and changes as may come within the scope of the following claims.

What is claimed is:

1. In an implement for extracting bulk food from cans, a handle, an elongated blade secured to said handle and having an arcuate configuration, a cutting edge formed on one side of said elongated blade and a plurality of spaced teeth formed on the other side of said blade, said teeth being arcuate in shape and having a radius of curvature substantially the same as said blade, said teeth being longer than the lateral dimension of said blade and adapted to deeply penetrate into said food during the food extracting operation.

2. In an implement for extracting plastic cohesive material from a can in a unitary mass, an elongated thin blade having a laterally arcuate configuration and adapted to be inserted into the can in contact with the inner surface of the can wall, a cutting edge formed on one longitudinal edge of said blade for cutting the adhesion between the can wall and the material in said can upon movement of the blade around the inner surface of the can wall, said cutting edge further defining a fulcrum for engaging the inner surface of the can wall when said implement is axially rotated, a plurality of spaced curved teeth projecting from the other longitudinal edge of said blade for penetrating said material, and a handle secured to said blade and extending outwardly of the top edge of said can for axially rotating said implement and forcing the fulcrum cutting edge of said blade into levering engagement with said can wall, said curved teeth thereby being forced into penetrating engagement with said material, and said material thereafter being removed intact as a unitary mass from said can by said penetrating teeth upon outer axial movement of said implement with respect to said can.

References Cited in the file of this patent

UNITED STATES PATENTS

| | | |
|---|---|---|
| 1,065,456 | Lowrey | June 24, 1913 |
| 1,169,921 | Burns | Feb. 1, 1916 |
| 1,323,980 | Hare | Dec. 2, 1919 |
| 1,713,529 | Grant | May 21, 1929 |
| 2,081,011 | Lautmann | May 18, 1937 |
| 2,132,320 | Quinn | Oct. 4, 1938 |
| 2,194,336 | Tullio | Mar. 19, 1940 |
| 2,291,179 | Woginrich | July 28, 1942 |
| 2,352,320 | Hatch | June 27, 1944 |